(12) United States Patent
Pratt

(10) Patent No.: US 12,108,748 B2
(45) Date of Patent: Oct. 8, 2024

(54) WATER FILTERING PET BOWL ASSEMBLY

(71) Applicant: Christopher Pratt, Millersburg, OH (US)

(72) Inventor: Christopher Pratt, Millersburg, OH (US)

(*) Notice: Subject to any disclaimer, the term of this patent is extended or adjusted under 35 U.S.C. 154(b) by 268 days.

(21) Appl. No.: 17/693,835

(22) Filed: Mar. 14, 2022

(65) Prior Publication Data

US 2022/0295742 A1    Sep. 22, 2022

Related U.S. Application Data

(60) Provisional application No. 63/163,204, filed on Mar. 19, 2021.

(51) Int. Cl.
*A01K 7/02* (2006.01)

(52) U.S. Cl.
CPC ..................... *A01K 7/02* (2013.01)

(58) Field of Classification Search
CPC .......... A01K 7/02; A01K 7/00; A01K 5/0225; A01K 39/02
See application file for complete search history.

(56) References Cited

U.S. PATENT DOCUMENTS

| | | | | |
|---|---|---|---|---|
| 5,799,609 A | * | 9/1998 | Burns | A01K 7/02 119/74 |
| 8,117,991 B1 | * | 2/2012 | Civitillo | A01K 7/027 119/72 |
| 8,763,557 B2 | | 7/2014 | Lipscomb et al. | |
| 8,813,683 B2 | | 8/2014 | Lipscomb et al. | |
| 9,402,375 B2 | | 8/2016 | Lipscomb | |
| 9,474,249 B2 | | 10/2016 | Lipscomb | |
| 9,497,930 B2 | | 11/2016 | Lipscomb et al. | |
| 9,572,323 B2 | | 2/2017 | Lipscomb et al. | |
| 9,826,712 B2 | | 11/2017 | Lipscomb et al. | |
| 2010/0300366 A1 | | 12/2010 | Lipscomb et al. | |
| 2014/0102374 A1 | | 4/2014 | Lipscomb et al. | |
| 2019/0098866 A1 | | 4/2019 | Paxson | |

OTHER PUBLICATIONS

Sale listings from Mar. 26, 2020.
PetSafe Cat and Dog Water Dispenser; retrieved from web in Jan. 2021.
Pioneer Pet Raindrop Fountain; retrieved from web in Jan. 2021.

* cited by examiner

*Primary Examiner* — Kristen C Hayes
(74) *Attorney, Agent, or Firm* — RENNER KENNER GREIVE BOBAK TAYLOR & WEBER

(57) ABSTRACT

A water filtering pet bowl assembly includes a bowl including a raised drinking water location, a bottom to-be-pumped water location having a raised platform, and a central channel between the raised drinking water location and the bottom to-be-pumped water location, such that, in an in-use operation of the water filtering pet bowl assembly, water flows by gravity flow from the raised drinking water location, through the central channel, and to the bottom to-be-pumped water location; a filter assembly positioned above the bottom to-be-pumped water location; and a pump coupled with the filter assembly and positioned in the bottom to-be-pumped water location; wherein, in the in-use operation of the water filtering pet bowl assembly, a base of the filter assembly is positioned on the raised platform.

14 Claims, 5 Drawing Sheets

WATER FILTERING PET BOWL ASSEMBLY

CROSS-REFERENCE TO RELATED APPLICATIONS

This application claims the benefit of U.S. Provisional Application No. 63/163,204, filed on Mar. 19, 2021, which is incorporated herein by reference.

FIELD OF THE INVENTION

The present invention relates to a water filtering pet bowl assembly. In one or more embodiments, a bowl of the water filtering pet bowl assembly can be made as a unitary ceramic piece.

BACKGROUND OF THE INVENTION

Some assemblies for providing water for a pet include recirculating the water, which generally serves to keep the water fresh by moving and filtering the recirculated water. While certain recirculating assemblies have been utilized, they may suffer from certain disadvantages. For example, some can be difficult for a user to assemble and subsequently disassemble for cleaning. Others are made of non-sturdy or bacteria-inviting material. Still others may have small, expensive, and ineffective filters.

An improved water filtering pet bowl assembly remains desirable.

SUMMARY OF THE INVENTION

In a first embodiment, the present invention provides a water filtering pet bowl assembly includes a bowl including a raised drinking water location, a bottom to-be-pumped water location having a raised platform, and a central channel between the raised drinking water location and the bottom to-be-pumped water location, such that, in an in-use operation of the water filtering pet bowl assembly, water flows by gravity flow from the raised drinking water location, through the central channel, and to the bottom to-be-pumped water location; a filter assembly positioned above the bottom to-be-pumped water location; and a pump coupled with the filter assembly and positioned in the bottom to-be-pumped water location; wherein, in the in-use operation of the water filtering pet bowl assembly, a base of the filter assembly is positioned on the raised platform.

In another embodiment, the present invention provides a pet water bowl comprising a raised drinking water location; a bottom to-be-pumped water location having a bottom for receiving water therein, a raised platform positioned above the bottom and being shaped to receive a base of a filter assembly, the raised platform being made of two segments each including a central base extending in a curved manner to rounded ends at each end of the central base, and a border portion positioned above the raised platform; and a central channel between the raised drinking water location and the bottom to-be-pumped water location; such that, in an in-use operation of the pet water bowl, water flows by gravity flow from the raised drinking water location, through the central channel, and to the bottom to-be-pumped water location.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

One or more embodiments of the present invention provide a water filtering pet bowl assembly. The water filtering pet bowl assembly includes a bowl for holding water, and a pump and filter assembly for filtering and recirculating the water. The pump and filter assembly keeps the drinking water clean, as well as improves the taste and odor of the water. In one or more embodiments, the bowl can advantageously be made as a ceramic piece, which may be a unitary ceramic piece.

With reference to FIGS. 1-10, a water filtering pet bowl assembly according to one or more embodiments of the present invention is generally indicated by the numeral 10. Water filtering pet bowl assembly 10, which may also be referred to as recirculating water assembly 10, includes a bowl 12 and a pump and filter assembly 14 positioned on bowl 12 in the in-use position shown in FIG. 1.

Figure 1:
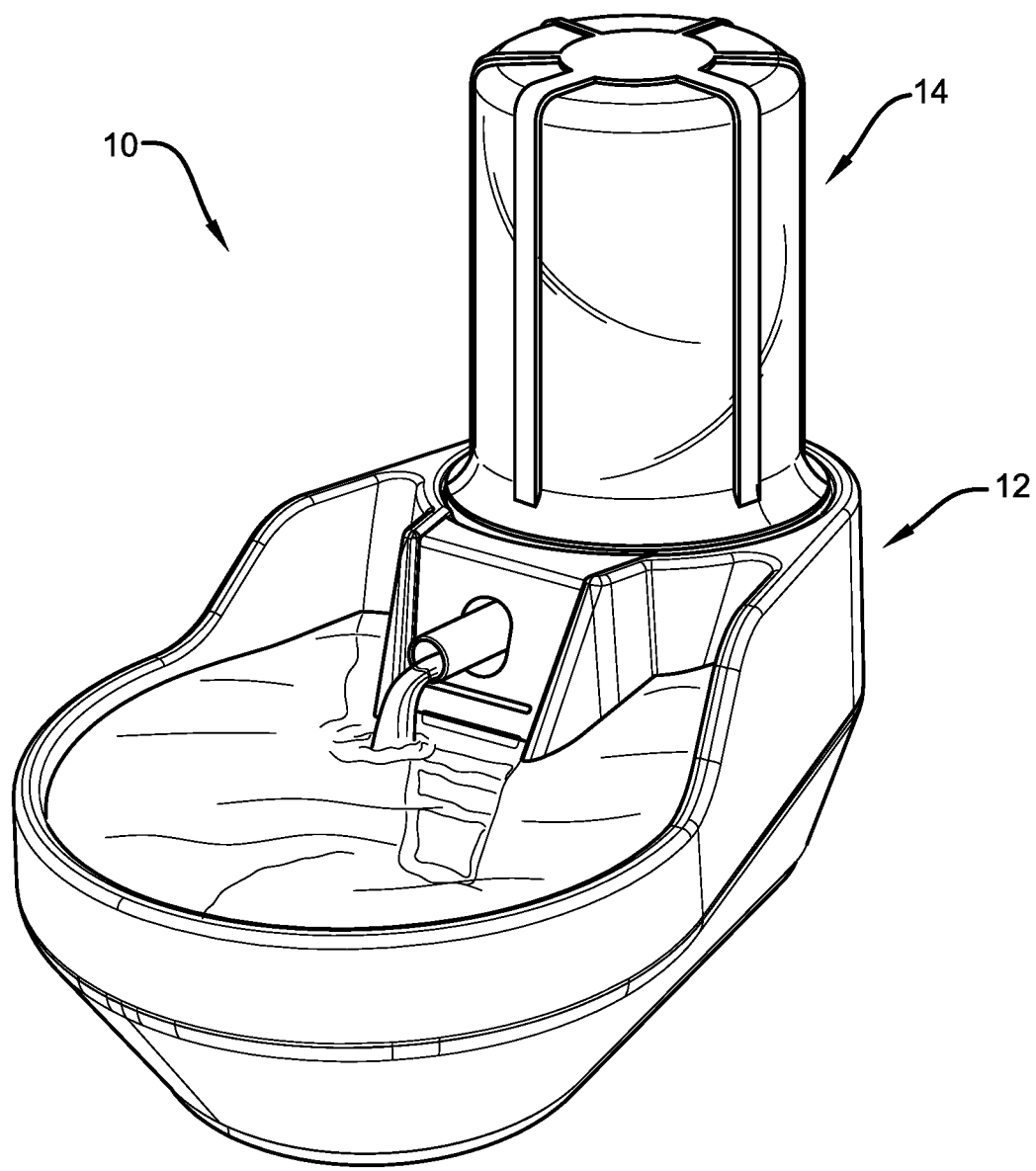
FIG. 1 is a perspective view of a water filtering pet bowl assembly, according to one or more embodiments of the present invention.
Figure 2:
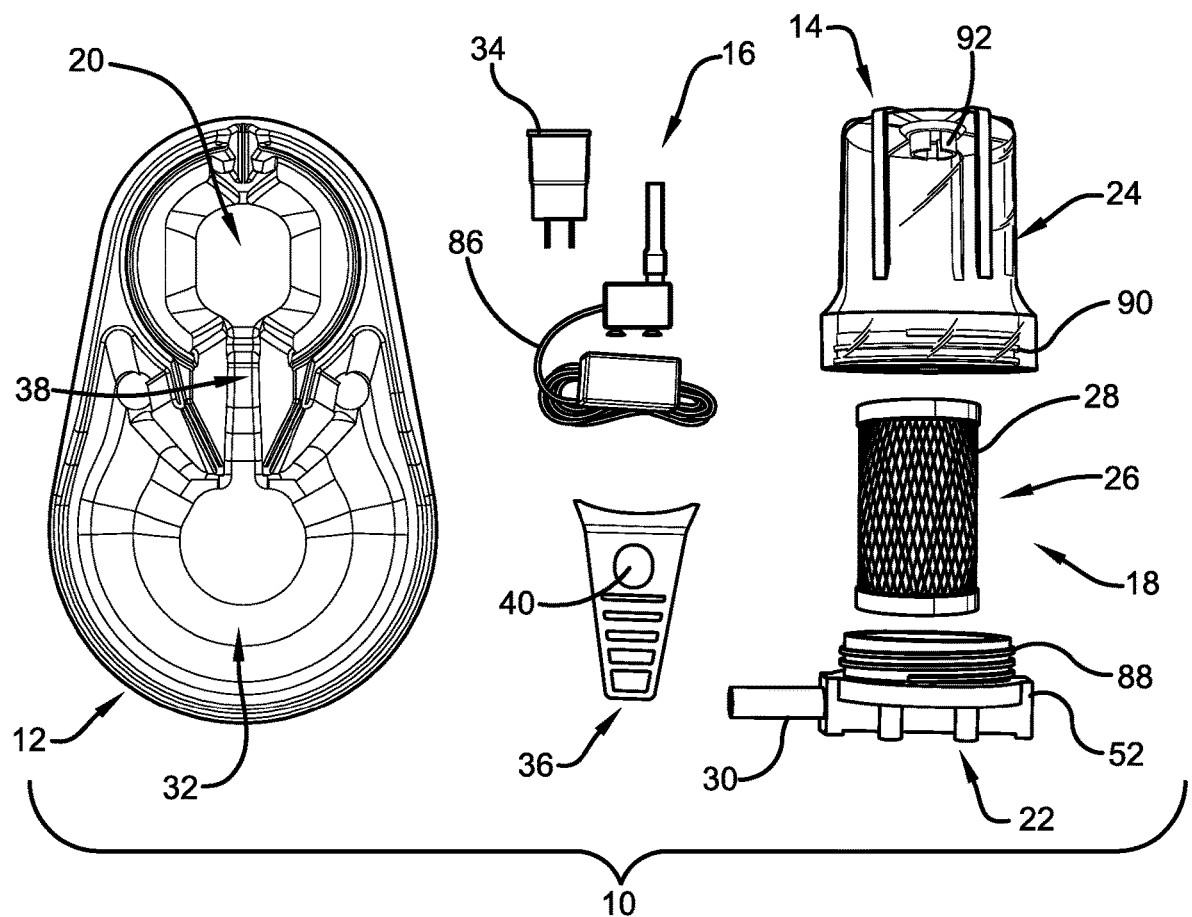
FIG. 2 is a perspective view of the water filtering pet bowl assembly shown in FIG. 1, shown with the components disassembled.
Figure 3:
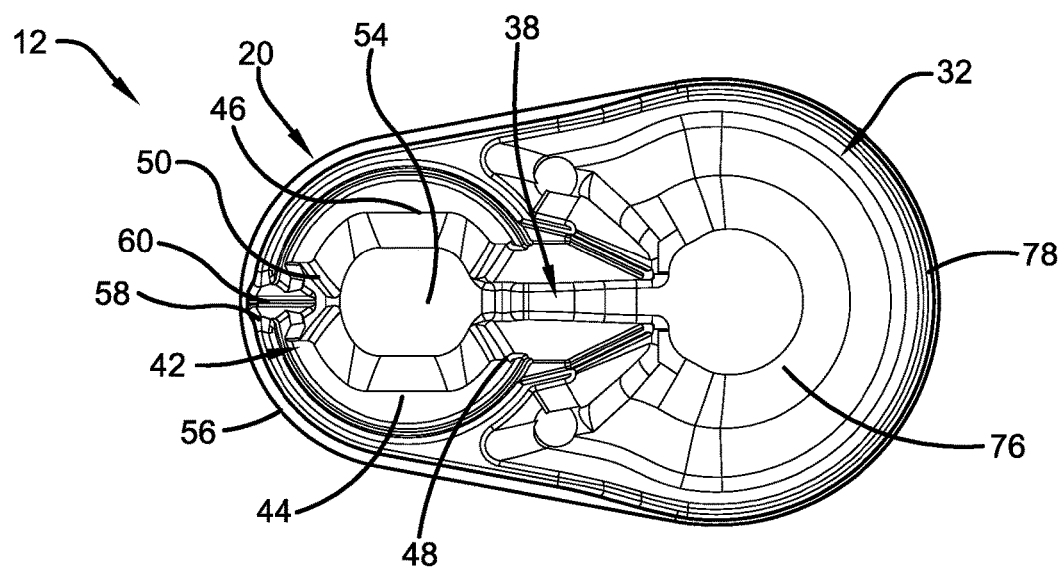
FIG. 3 is a top view of a bowl of the water filtering pet bowl assembly shown in FIG. 1.
Figure 4:
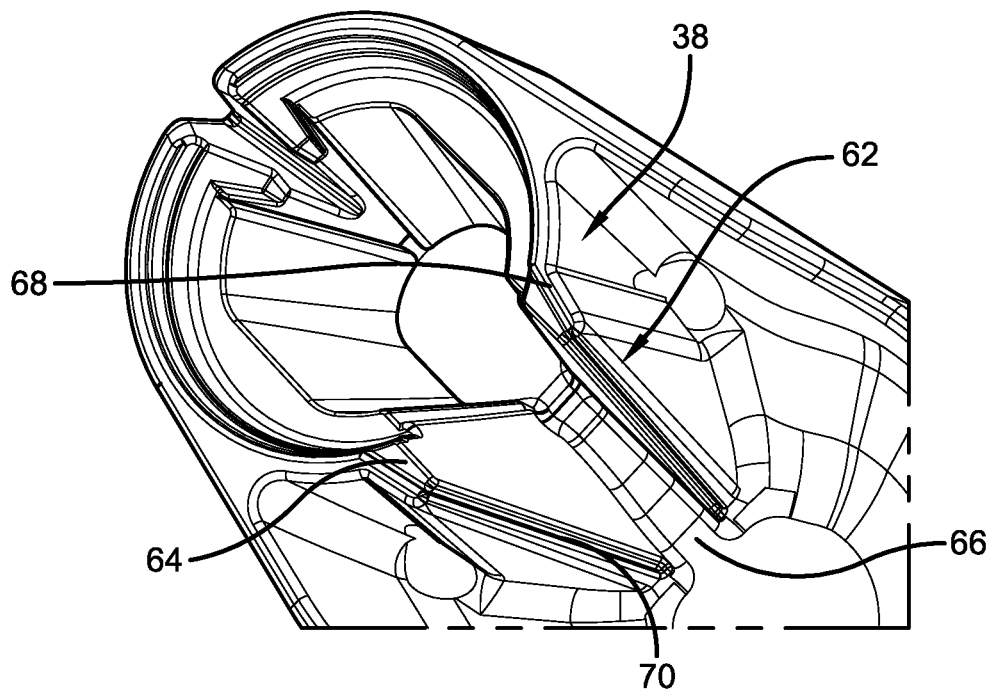
FIG. 4 is a perspective view of the bowl shown in FIG. 3.
Figure 5:
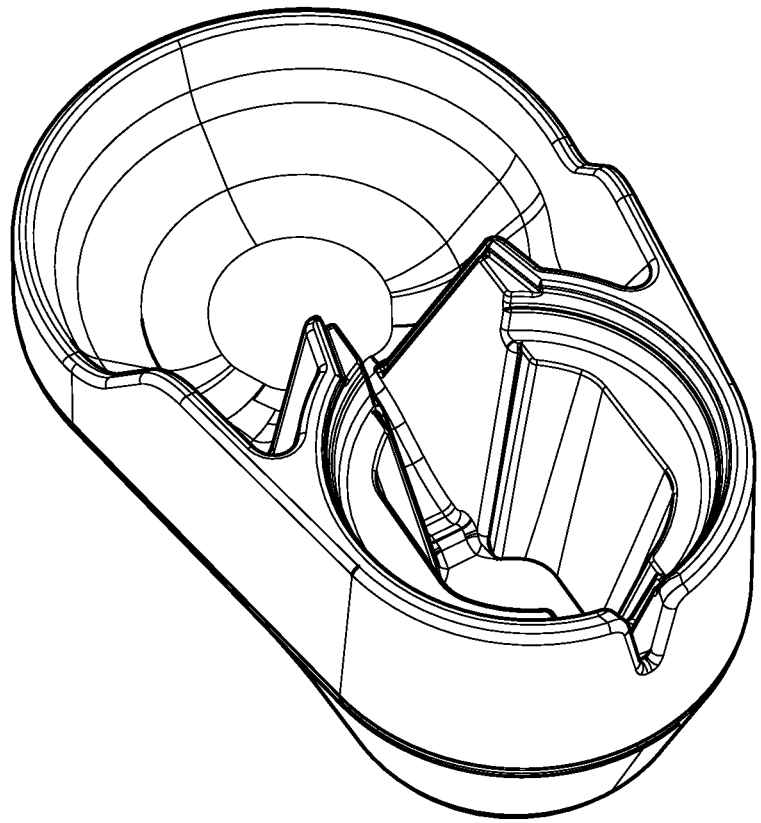
FIG. 5 is an alternate perspective view of the bowl shown in FIG. 3.
Figure 7:
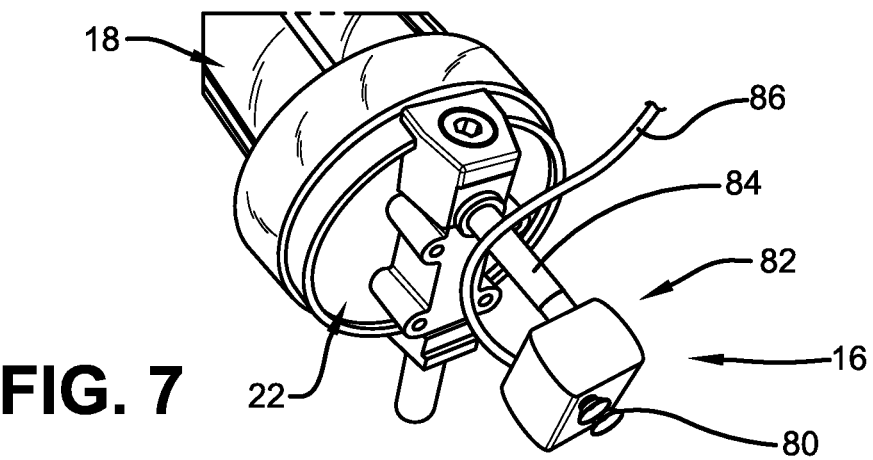
FIG. 7 is a perspective view of a filter assembly of the water filtering pet bowl assembly shown in FIG. 1.

As shown in FIGS. 2 and 7, pump and filter assembly 14 includes a pump 16 that feeds water to a filter assembly 18 for filtering and recirculating the water. Pump 16 takes in water from a bottom to-be-pumped water location 20 of bowl 12 and pumps the water into filter assembly 18. The pumped water is provided to a threaded base 22. The water fills a water-receiving portion of threaded base 22 and begins to fill a threaded filter housing 24 that is secured with base 22 in the in-use position.

The water eventually flows from housing 24 and through a filter 26. More specifically, the water flows from an outer perimeter 28 of filter 26 to an inner perimeter (not seen). The inner perimeter of filter 26 is coupled with a flow channel (not seen) that extends to a nozzle 30. The flow channel and the inner perimeter of filter 28 are isolated from the water in base 22 and the water outside outer perimeter 28 such that the unfiltered water cannot pass into the flow channel or the inner perimeter. Only the water that passes through filter 26 enters the flow channel and the nozzle 30. Nozzle 30 then returns the filtered water to a raised drinking water location 32 of bowl 12.

As further brief initial discussion of the various components that may be present in water filtering pet bowl assembly 10, pump 16 may be powered by an electrical plug 34, which may be a USB electrical plug 34. Also, nozzle 30 may pass through a cover 36 that is positioned over a central channel 38 of bowl 12. More specifically, nozzle 30 may pass through a nozzle hole 40 of cover 36. As will be further discussed herein, cover 36 generally serves to further secure the position of filter assembly 18 relative to bowl 12.

Figure 6:
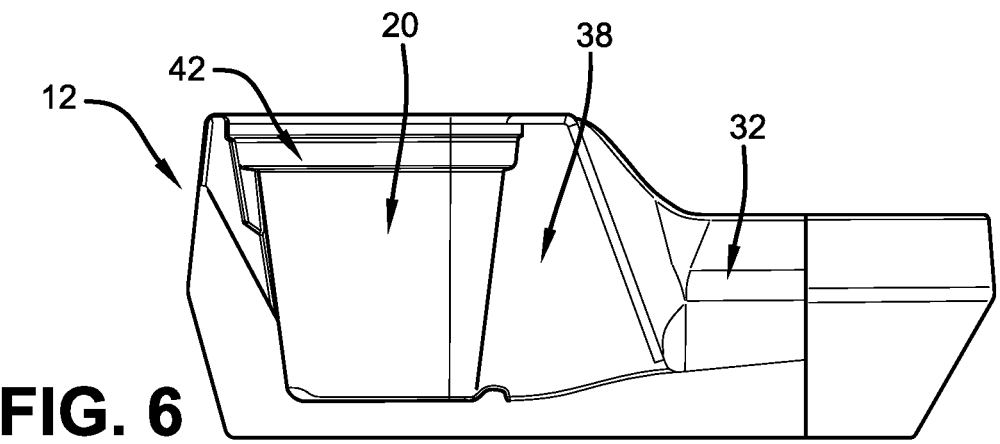
FIG. 6 is a side view of the bowl shown in FIG. 3, shown with partial transparency to reveal the inner structure thereof.

As mentioned above, and as perhaps best seen in FIGS. 2, 3, and 6, bowl 12 includes central channel 38 between bottom to-be-pumped water location 20 and raised drinking water location 32. The raised drinking water location 32 is located in the front of water filtering pet bowl assembly 10 and provides filtered water for a pet to drink. As seen in FIG. 6, water flows by gravity flow from raised location 32, through central channel 38, and to bottom location 20. Pump and filter assembly 14 then recirculates the water from bottom location 20 back to raised location 32.

The bowl 12 should be shaped such that the inlet of pump 16 sits lower in the bowl 12 than the bottom of the raised drinking water location 32. This can be seen in FIG. 6, though without the pump 16 being shown. If the water level drops in raised location 32, there may not be standing water in raised location 32, but water can still be cycling through pump and filter assembly 14. This prevents the pump 16 from running dry.

Bottom location 20 includes a raised platform 42, which may also be referred to as a shelf 42, to hold and locate filter assembly 18 at the appropriate height. More specifically, base 22 of filter assembly 18 rests on a top surface 44 of platform 42 in the in-use position. In the in-use operation, shelf 42, and therefore base 22 also, are preferably above the water level in bottom location 20. That is, only pump 16 is within the water level in bottom location 20. In this way, assembly 10 may be said to eliminate small stagnant spots where bacteria might otherwise grow within the bowl 12.

Platform 42 is shown made of two segments each including a central base 46 extending in a curved manner to rounded ends 48 at each end of base 46. Between one set of rounded ends 48 is an electrical cord slot 50 for receiving an electrical cord for pump 16. Between the other set of rounded ends 48 is a portion of central channel 38. The two segments of platform 42 may be a partial circular or partial oval shape. In one or more embodiments, the two segments of platform 42 may generally correspond with the shape of a lip 52 of base 22. In one or more embodiments, and as shown in the Figures, base 46 may be of a more linear extension configuration within the partial circular or oval shape, which generally serves to provide additional support for base 22 and filter assembly 18. The two segments of platform 42 may taper from an upper wider portion at top surface 44 down to a lower narrower portion at a bottom 54 of bottom to-be-pumped water location 20.

A border portion 56 is positioned above platform 42. In the in-use position, base 22 is further prevented from outward movement by the border portion 56 (see FIG. 8). Border 56 is shown with two segments each of a partial circle shape. Between one set of rounded ends 58 of the two segments is an electrical cord slot 60 for receiving an electrical cord for pump 16. Between the other set of rounded ends 58 is a portion of central channel 38. In addition to partial circular, the two segments of border 56 may be a partial oval shape. In one or more embodiments, the two segments of border 56 may generally correspond with the outer perimeter of lip 52 of base 22.

As further description of central channel 38, central channel 38 includes two tapered sidewalls 62. Tapered sidewalls 62 taper from an upper wider portion at a top surface 64 down to a lower narrower portion at a bottom 66 of central channel 38. Above tapered sidewalls 62 is a respective top border segment 68 that extends down to a respective front border segment 70.

Top border segment 68 is tapered in a front-to-back manner. That is, it is wider between the border segments 68 nearer the bottom location 20 of bowl 12 and it is narrower between the border segments 68 nearer the raised location 32 of bowl 12. Similarly, cover 36 includes a top portion 72 (FIG. 9) that is tapered in the same manner. That is, top portion 72 is wider near the rear and narrower near the front. In this way, when cover 36 is placed in the in-use position (FIG. 9) by setting cover 36 in place from the top, cover 36 is prevented from movement in a frontward manner. The tapering of top portion 72 of cover 36 contacts the tapering of top border segment 68 and frontward movement is not possible.

Figure 8:
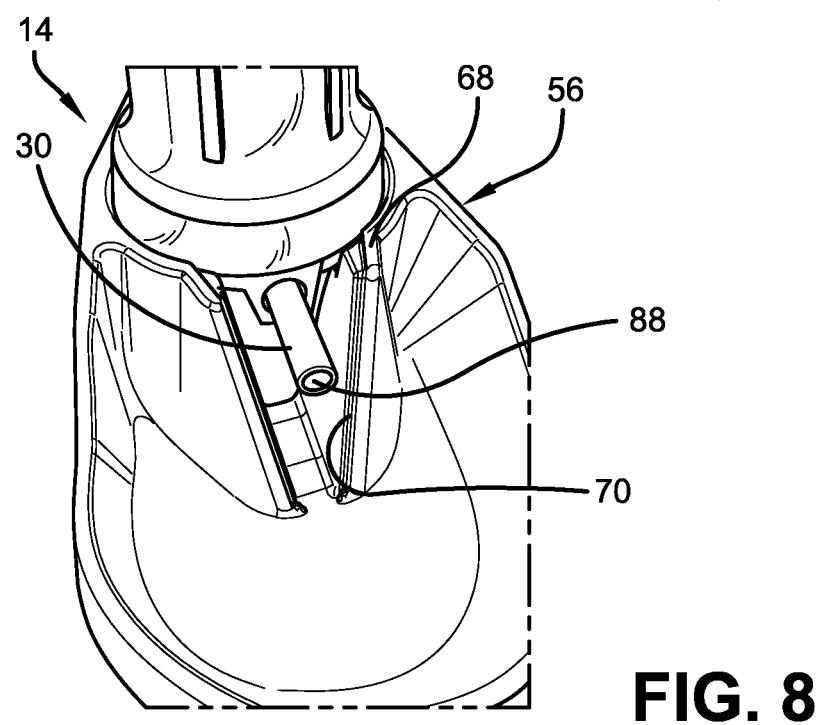
FIG. 8 is a perspective view showing the filter assembly positioned on the bowl, shown without a nozzle cover.
Figure 9:
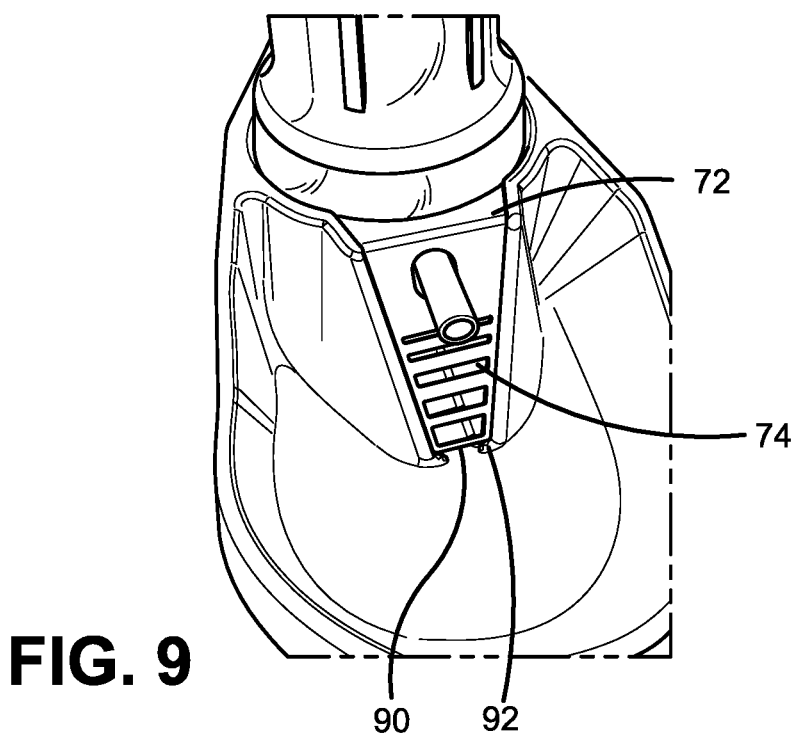
FIG. 9 is a perspective view showing the filter assembly positioned on the bowl, shown with the nozzle cover.
Figure 10:
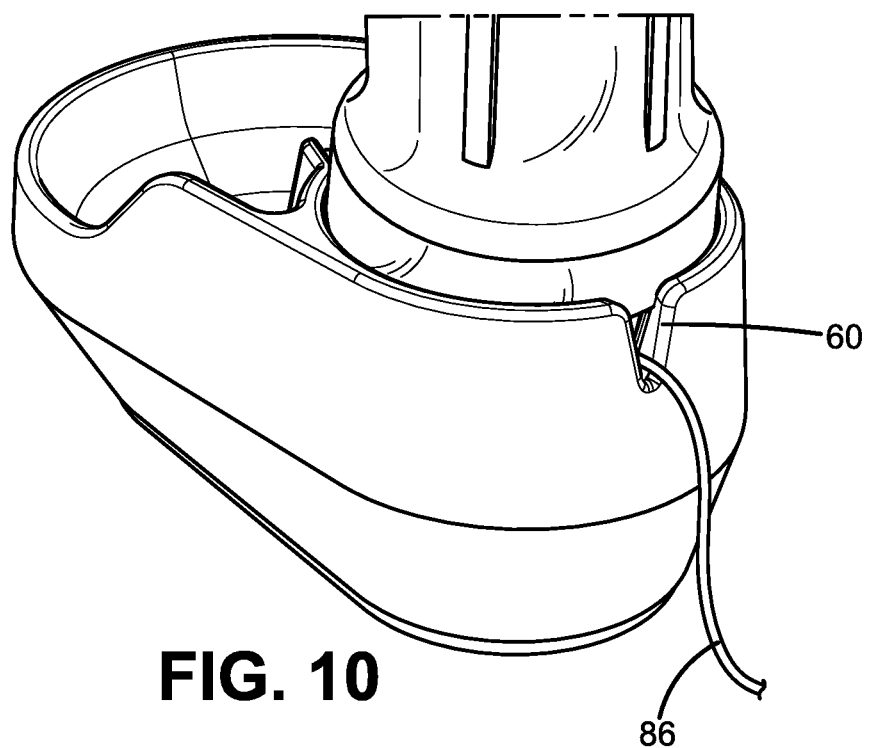
FIG. 10 is a perspective view of the bowl, showing a slot for an electrical cord.

As shown in FIGS. 8 and 9, cover 36, which may be made of metal or another suitable material, is placed over the nozzle 30 such that nozzle 30 is through nozzle hole 40 in the in-use configuration. By way of debris holes 74, cover 36 allows water therethrough while also blocking any large debris from entering the center channel 38. To disassemble for cleaning, the cover 36 can simply be lifted off along with the pump and filter assembly 14. As shown in the Figures, in one or more embodiments, the debris holes 74 may include larger holes near the bottom of cover 36 and smaller holes near the top of cover 36. In other embodiments, all the holes may be sized of a similar size, such as a smaller size as to catch smaller debris. Though not shown in the Figures, a pre-filter may be located in center channel 38 if necessary.

As best seen in FIG. 9, cover 36 includes a bottom end 90 that is held from the bottom of bowl 12 by a pair of protrusions 92. A gap exists between each of the protrusions 92 for any sunken debris to pass through. In this way, since bottom end 90 does not extend to the bottom of bowl 12, any sunken debris will not tend to collect in raised location 32 of bowl 12. Rather, the sunken debris will make its way through the gap between the protrusions 92 and to the pump 16 and filter assembly 14 for filtration and removal.

As further description of raised drinking water location 32, raised location 32 includes a drinking area 76 surrounded by a border 78 for maintaining the water in the drinking area 76. As shown in the Figures, drinking area 76 may extend into the space external of tapered sidewalls 62. The portion of drinking area 76 not immediately external of tapered sidewalls 62 may be shaped as a partial circle or partial oval.

As mentioned above, in one or more embodiments, it may be advantageous to make bowl 12 from ceramic. Suitable ceramic materials will be generally known to the skilled person. Suitable ceramic materials should not absorb water. Suitable ceramic materials may be vitrified, meaning the material is transformed into an amorphous solid material thereby achieving vitrification and impermeability to water. Exemplary ceramic materials include stoneware and porcelain. Ceramic materials can be more resistant to bacteria than other materials.

In other embodiments, it may be suitable to utilize a hard plastic or stainless steel as the material for bowl 12. Though, in still other embodiments, bowl 12 may consist essentially of or consist of ceramic material such that bowl 12 itself is devoid of other materials.

As also mentioned above, in one or more embodiments, it may be advantageous to make bowl 12 as a unitary piece. This can reduce manufacturing and assembly time, in addition to providing easier cleaning.

In other embodiments, bowl 12 has a water capacity of about 64 ounces, in other embodiments, about 50 ounces, in other embodiments, about 60 ounces, in other embodiments, about 70 ounces, and in other embodiments, about 80 ounces. In one or more embodiments, bowl 12 has a water capacity of from 50 ounces to 80 ounces, in other embodiments, from 60 ounces to 70 ounces, and in other embodiments, from 60 ounces to 65 ounces.

As discussed above, pump and filter assembly 14 includes a pump 16 that feeds water to a filter assembly 18. Pump 16 includes an inlet port 80 for receiving water from bottom 54 of bottom location 20. A pump mechanism 82 draws water into inlet port 80 and up into a connection tube 84 connecting to base 22. The connection tube 84, which may be referred to as a hose 84, attaches to base 22 via a friction fit between the hose 84 and the base 22, which may also be referred to as a housing lid 22. In this way, the hose 84 can be moved up and down such that the depth of the inlet port 80 can be adjusted.

Pump mechanism 82 includes an electrical cord 86 coupled therewith that fits within the electrical cord slot 50 and the electrical cord slot 60 in the in-use configuration. Pump mechanism 82 and electrical cord 86 should be properly sealed from exposure of electrical components to water.

The size of pump 16, along with the size of a diameter 88 of nozzle 30, may be designed as to provide a laminar flow when the raised drinking water location 32 has a sufficient amount of water. Similarly, pump 16 and diameter 88 may also be sized such that water coming out of nozzle 30 makes a trickling noise when raised drinking water location 32 needs filled, in part because the water is falling farther to the low surface of the water in raised drinking water location 32. This height between nozzle 30 and a low amount of water in raised drinking water location 32 may cause the flow to start to separate and create more noise as the water splashes into the raised drinking water location 32.

In one or more embodiments, the height between a bottom of nozzle 30 and a surface of water in raised drinking water location 32 when full is about 0.5 inches, which is also when the water pouring from nozzle 30 into raised drinking water location 32 is quiet. In one or more embodiments, the height between the bottom of nozzle 30 and the surface of water in raised drinking water location 32 when the water pouring from nozzle 30 into raised drinking water location 32 begins to make noise is about 1 inch. In one or more embodiments, the height between the bottom of nozzle 30 and the surface of water in raised drinking water location 32 when the water pouring from nozzle 30 into raised drinking water location 32 begins to become louder and more noticeable is from about 1 inch to about 1.5 inches. In one or more embodiments, the height between the bottom of nozzle 30 and the surface of water in raised drinking water location 32 when raised drinking water location 32 is close to empty is about 1.5 inches.

Suitable pumps 16 will be generally known to the skilled person. Pump 16 should be of low voltage as to eliminate any shock risk to the pets using the assembly 10 should any wires happen to be chewed or damaged.

As discussed above, filter assembly 18 includes base 22, housing 24, and filter 26. Base 22 includes a threading 88 that corresponds with a threading 90 of housing 24 in order to secure base 22 with housing 24 in a water-tight manner. As mentioned above, the flow channel and the inner perimeter of filter 26 are isolated from the water in base 22 and the water outside outer perimeter 28 such that the unfiltered water cannot pass into the flow channel or the inner perimeter. The housing 24 may include a protrusion 92 that extends down into the inner perimeter of filter 26 to prevent water from spilling over into the inner perimeter without passing through the filter 26.

Suitable filters 26 will be generally known to the skilled person. The filter 26 may be generally cylindrical in shape, though other shapes may be suitable. Exemplary material for filters 26 is powdered activated carbon (PAC), which may be coconut shell PAC. An exemplary commercially available filter is available under the trade name SpiroPure SP-EP-5. An exemplary size for a cartridge filter is about 5" length× about 2.5" diameter, and in other embodiments about 4.89" length×about 2.72" diameter.

As discussed above, water filtering pet bowl assembly 10 provides many advantages, including easiness for cleaning. Other specific advantages include ease of filling with water, as more water just needs to be poured into the bowl 12 without the filling of a tank; ease of assembly and disassembly, as the pump and filter assembly 14 can be lifted off and easily taken to a cleaning location in one piece; design and shape of bowl 12 limits stagnant spots; and only the pump 16 is submerged underwater.

In light of the foregoing, it should be appreciated that the present invention advances the art by providing a water filtering pet bowl assembly. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A water filtering pet bowl assembly comprising
a bowl including
    a raised drinking water location,
    a bottom to-be-pumped water location having a raised platform, and
    a central channel between the raised drinking water location and the bottom to-be-pumped water location,
    such that, in an in-use operation of the water filtering pet bowl assembly, water flows by gravity flow from the raised drinking water location, through the central channel, and to the bottom to-be-pumped water location;
a filter assembly positioned above the bottom to-be-pumped water location; and
a pump coupled with the filter assembly and positioned in the bottom to-be-pumped water location;
wherein, in the in-use operation of the water filtering pet bowl assembly, a base of the filter assembly is positioned on the raised platform,
wherein an inlet of the pump is positioned lower in the bowl than a bottom of the raised drinking water location, such that the pump is prevented from running dry in the in-use operation of the water filtering pet bowl assembly.

2. The water filtering pet bowl assembly of claim 1, wherein, in the in-use operation of the water filtering pet bowl assembly, the raised platform and the base of the filter are above a water level in the bottom to-be-pumped water location.

3. The water filtering pet bowl assembly of claim 1, wherein, in the in-use operation of the water filtering pet bowl assembly, the pump and the filter assembly recirculate water from the bottom to-be-pumped water location to the raised drinking water location.

4. The water filtering pet bowl assembly of claim 1, wherein the bowl is a unitary ceramic piece.

5. A water filtering pet bowl assembly comprising
a bowl including
a raised drinking water location,
a bottom to-be-pumped water location having a raised platform, and
a central channel between the raised drinking water location and the bottom to-be-pumped water location,
such that, in an in-use operation of the water filtering pet bowl assembly, water flows by gravity flow from the raised drinking water location, through the central channel, and to the bottom to-be-pumped water location;
a filter assembly positioned above the bottom to-be-pumped water location; and
a pump coupled with the filter assembly and positioned in the bottom to-be-pumped water location;
wherein, in the in-use operation of the water filtering pet bowl assembly, a base of the filter assembly is positioned on the raised platform,
wherein the raised platform is made of two segments each including a central base extending in a curved manner to rounded ends at each end of the central base.

6. The water filtering pet bowl assembly of claim 5, wherein between one set of the rounded ends is an electrical cord slot for receiving an electrical cord for the pump, and wherein between another set of the rounded ends is a portion of the central channel.

7. A water filtering pet bowl assembly comprising
a bowl including
a raised drinking water location,
a bottom to-be-pumped water location having a raised platform, and
a central channel between the raised drinking water location and the bottom to-be-pumped water location,
such that, in an in-use operation of the water filtering pet bowl assembly, water flows by gravity flow from the raised drinking water location, through the central channel, and to the bottom to-be-pumped water location;
a filter assembly positioned above the bottom to-be-pumped water location; and
a pump coupled with the filter assembly and positioned in the bottom to-be-pumped water location;
wherein, in the in-use operation of the water filtering pet bowl assembly, a base of the filter assembly is positioned on the raised platform,
wherein a border portion is positioned above the raised platform, such that the base of the filter assembly is prevented from outward movement by the border portion.

8. A water filtering pet bowl assembly comprising
a bowl including
a raised drinking water location,
a bottom to-be-pumped water location having a raised platform, and
a central channel between the raised drinking water location and the bottom to-be-pumped water location,
such that, in an in-use operation of the water filtering pet bowl assembly, water flows by gravity flow from the raised drinking water location, through the central channel, and to the bottom to-be-pumped water location;
a filter assembly positioned above the bottom to-be-pumped water location; and
a pump coupled with the filter assembly and positioned in the bottom to-be-pumped water location;
wherein, in the in-use operation of the water filtering pet bowl assembly, a base of the filter assembly is positioned on the raised platform,
wherein the central channel includes two tapered sidewalls each tapering from an upper wider portion at a top surface down to a lower narrower portion at a bottom of the central channel.

9. The water filtering pet bowl assembly of claim 8, wherein each tapered sidewall includes a respective top border segment thereabove, the top border segment extending down to a respective front border segment.

10. The water filtering pet bowl assembly of claim 9, wherein a nozzle cover is positioned over the central channel.

11. The water filtering pet bowl assembly of claim 10, wherein the top border segments are tapered in a front-to-back manner, such that a distance between the top border segments is wider nearer the bottom to-be-pumped water location and the distance between the top border segments is narrower nearer the raised drinking water location.

12. The water filtering pet bowl assembly of claim 11, wherein the nozzle cover includes a top portion that is tapered in a manner corresponding to the front-to-back manner such that the cover is prevented from movement in a frontward manner.

13. The water filtering pet bowl assembly of claim 10, wherein the nozzle cover includes a nozzle hole for a nozzle of the filter assembly to pass therethrough.

14. The water filtering pet bowl assembly of claim 10, wherein the nozzle cover includes a bottom end that does not contact a bottom of the bowl.

* * * * *